Aug. 23, 1960     G. J. BOLSTAD     2,950,365
ANTI-OVERTURNING DEVICE FOR VEHICLES
Filed Dec. 11, 1958
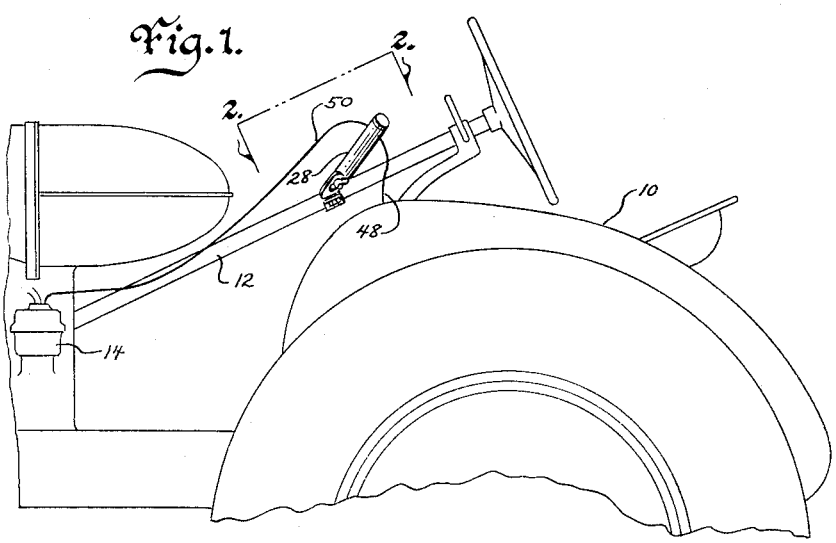
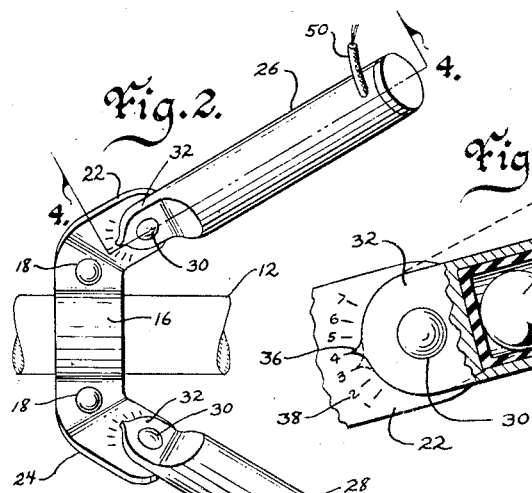
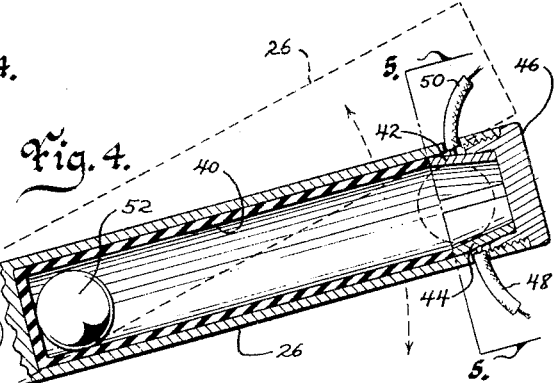
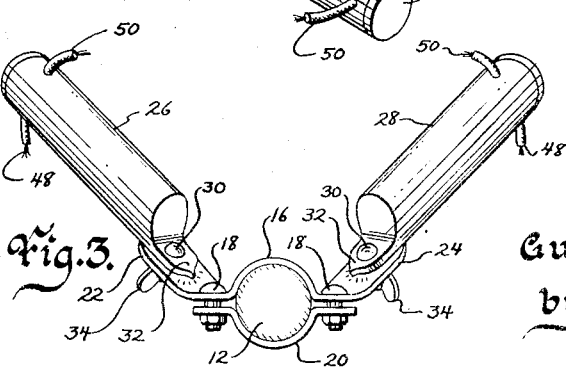
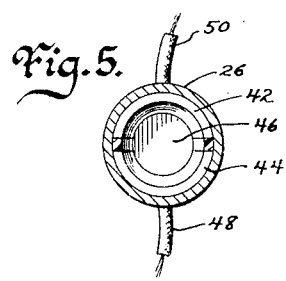
Inventor
Gustav John Bolstad
by Donald H. Zarley
Attorney

United States Patent Office 2,950,365
Patented Aug. 23, 1960

2,950,365

ANTI-OVERTURNING DEVICE FOR VEHICLES

Gustav John Bolstad, 415 S. Iowa St., Charles City, Iowa

Filed Dec. 11, 1958, Ser. No. 779,661

3 Claims. (Cl. 200—61.52)

My invention relates to safety devices and more particularly to a device which will assist in the prevention of overturning of vehicles.

Many persons are injured or killed every year because of overturning vehicles. The danger of injury or death from an overturning vehicle is particularly present in the case of farm tractors which many times are required to be operated on rough terrain. The tractors not only tip over sideways but oftentimes turn over backwards as a tractor attempts to climb an incline. If the operator is not immediately crushed by the overturning tractor, he is sometimes injured or killed after the tractor has turned over but continues to operate.

Therefore, the principal object of my invention is to provide a device which will prevent vehicles in general and tractors in particular from turning over while being operated.

A further object of my invention is to provide a device that will automatically stop the operation of the tractor if it does become upset.

A still further object of my invention is to provide a device which will prevent a vehicle from catching on fire if it becomes overturned.

A still further object of my invention is to provide an anti-overturning device for vehicles which will be sensitive to overturning in any direction.

A still further object of my invention is to provide an anti-overturning device for vehicles which is economical of manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is an elevational view of my device mounted on the steering post of a tractor;

Fig. 2 is a top view of my device as viewed from the line 2—2 of Fig. 1;

Fig. 3 is a front elevational view of my device as viewed on the steering post of a vehicle;

Fig. 4 is a partial sectional view of my device taken on line 4—4 of Fig. 2; and Fig. 5 is a sectional view of my device taken on line 5—5 of Fig. 4.

I have used the numeral 10 to generally designate a conventional farm tractor which has a steering post 12 and a distributor 14. The distributor 14 is of conventional design and is an integral part of the tractor motor, the details of which are not shown. A bracket 16 is secured to steering post 12 by bolts 18 which extend through registering holes in the bracket 16 and clip element 20. This structure is clearly shown in Fig. 3. The end portions of bracket 16 extend upwardly, rearwardly and outwardly from the center portion of the bracket to form ear portions 22 and 24. Each of the ear portions 22 and 24 has a hole therein which is not depicted in any of the drawings. Hollow tubes 26 and 28 are secured to ears 22 and 24 by means of stud bolts 30 which are rigidly secured to an ear portion 32 which in turn extends from the forward ends of the tubes 26 and 28. Stud bolts 30 extend through the holes in ears 22 and 24 to threadably receive wing nuts 34. Ears 32 on tubes 26 and 28 should be in alignment with the longitudinal axis of the tubes and should have a pointer element 36 on their forward tips. The pointer elements 36 are clearly shown in Fig. 4. Indicia marks 38 appear on the top surface of ears 22 and 24 and are so located to fall along the outer periphery of the ears 32. Stud bolts 30 can be moved relative to the ears 22 and 24 so that the position of the tubes 26 and 28 can be adjusted with respect to the ears 22 and 24.

Tubes 26 and 28 should preferably be of a material which will not conduct electricity. Each tube has a special liner 40 which definitely should be unable to conduct an electrical current and which is preferably made of rubber or plastic. As shown in Fig. 4, liner 40 terminates a short distance from the rearward or outer ends of the tubes 26 and 28. Two spaced apart frusto-conical shaped elements 42 and 44 are mounted upon the rearward end of liner 40 and are held in place by a plug element 46 which is threadably received in the outer end of the tubes. Elements 42 and 44 should be capable of conducting an electric current but plug 46 should not have this property. Each of the tubes 26 and 28 has small openings in its outer rearward ends through which pass electro-conducting wire elements 48 and 50. It should again be noted that the elements 42 and 44 are spaced apart and are rigidly held in this position by the plug 46 which is threadably received in the outer or rearward ends of the tubes. Since the elements 42 and 44 are frusto-conical in shape, the diameter of the interior of the tubes 26 and 28 is less at a point between the elements 42 and 44 than is the diameter of the interior of the liner 40. A steel ball member 52 which has a diameter slightly less than the interior of the liner 40 is located within each of the tubes 26 and 28 and adapted for free rotation therein. Wire 50 is connected to a terminal post in distributor 14 and wire 48 is a ground wire and is connected to any convenient point on the frame of tractor 10.

The normal operation of my device is as follows: My device is adapted for use on a farm tractor but could also easily be used on any other type of vehicle. The bracket 16 can be mounted on the steering post 12 of tractor 10 in the manner described or the bracket 16 can actually be mounted on any other convenient location on the tractor. As pointed out above, the exact position of the tubes 26 and 28 on the ears 22 and 24 of bracket 16 can be selectively adjusted by operating the wing nuts 34 on the stud bolts 30. Each tractor or other vehicle will upset whenever it is tipped to an angle of predetermined degree and the size of this angle is always determined by the location of the center of gravity of the vehicle. Since the rear wheels of tractors are often moved inwardly or outwardly for special occasions, the tipping angle of a given tractor is subject to change. Therefore, it is necessary that the position of the tubes 26 and 28 on the ears 22 and 24 be changed accordingly whenever the tipping angle of a given vehicle is changed. The angle that the longitudinal axis of tubes 26 and 28 makes with a horizontal line should always be slightly less than the predetermined tipping angle of the vehicle. In other words, if a vehicle with given wheel spacing will overturn when tipped to a 40 degree angle, tubes 26 and 28 should be positioned on ears 22 and 24 so as to form an angle with a horizontal line slightly less than 40 degrees. This angle of the tubes with a horizontal line should not be too much less than 40 degrees because it is not desirable that my device be actuated each time the vehicle is slightly tipped. The indicia 38 and the pointer element 36 on ears 22, 24 and on ears 32, respectively, assist the operator in adjusting the tubes 26 and 28 to different predetermined angles.

With the tractor motor running, an electrical impulse is present on the terminal poles of distributor 14. Whenever the tractor 10 begins to approach its tipping angle limit, the ball 52 in the tube on the side of the tractor towards which the tractor is tipping will move toward the outer or rearward ends of the tube. Since the angle of the tubes with a horizontal line is always less than the predetermined tipping angle of the tractor, ball 52 will engage the electro-conducting elements 42 and 44 an instant before the tractor reaches its overturning angle. As soon as ball 52 reaches the position shown by the dotted line in Fig. 4, an electric current is passed from the distributor 14 through the wire 50, through the element 42, through the ball 52, through the element 44, and through the ground wire 48 to the frame of tractor 10. This electric circuit grounds out the distributor and immediately stops the motor of the tractor. If the tractor is not traveling at too great a speed, the stopping of the motor will slow down the forward momentum of the tractor and cause it to maintain its equilibrium. If the tipping action of the tractor is very abrupt, as would be the case if the tractor were traveling at a high rate of speed, the stopping of the tractor motor in the manner described may not prevent the tractor from overturning. However, if the tractor overturns, the motor will be stopped and this will eliminate the possibility of fire after the tractor has overturned. Furthermore, the wheels of the tractor will not continue to rotate after the tractor has overturned and this will also increase the possibility that the operator will survive the accident if he has not been fatally injured by the initial overturning action.

By utilizing two tubes 26 and 28, my device will operate whether the tractor tips to the right hand or to the left hand and both of the tubes will operate if the tractor should overturn in a rearward direction.

Since the elevational angle of tubes 26 and 28 can be adjusted, my device can be used on many different tractors or can be used on a given tractor having adjustable wheel widths. Since the electro-conducting ball 52 has the same substantial diameter as the interior of liner 40, the ball 52 is not subject to erratic movement or bouncing within the tube whenever the tractor should hit an occasional bump. Therefore, my device will not be inadvertently operated when there is no immediate danger of overturning.

From the foregoing, it is seen that my device will accomplish at least all of its stated objectives.

Some changes may be made in the construction and arrangement of my anti-overturning device for vehicles without departing from the real spirit and purpose of my invention, and it is my intention to cover by my claims, any modified forms of structure or use of mechanical equivalents which may be reasonably included within their scope.

I claim:

1. In an anti-overturning device for vehicles, a bracket adapted to be secured to the frame of a vehicle, two elongated hollow tubes extending upwardly and outwardly from said bracket and away from each other, ear means independently, adjustably, pivotally securing said tubes to said bracket, said ears being inclined to said bracket to permit said tubes to pivot in angular inclined planes with respect to the plane of said bracket, separate electrical means on the outer ends of said tubes adapted to be electrically connected to the frame and distributor element, respectively, of a vehicle, and connecting means in said tubes for electrically connecting said separate electrical means when either of said tubes is moved by the tipping of said bracket to a substantially level position.

2. The structure of claim 1 wherein the connecting means are electro-conducting balls.

3. In an anti-overturning device for vehicles, a bracket adapted to be secured to the frame of a vehicle, two elongated hollow tubes extending upwardly and outwardly from said bracket and away from each other, ear means pivotally securing said tubes to said bracket, said ears being inclined to said bracket to permit said tubes to pivot in angular inclined planes with respect to the plane of said bracket, separate electrical means on the outer ends of said tubes adapted to be electrically connected to the frame and distributor element, respectively, of a vehicle, and connecting means in said tubes for electrically connecting said separate electrical means when either of said tubes is moved by the tipping of said bracket to a substantially level position.

References Cited in the file of this patent

UNITED STATES PATENTS

| | | |
|---|---|---|
| 1,393,312 | Perry | Oct. 11, 1921 |
| 1,611,219 | Minninger | Dec. 21, 1926 |
| 1,761,681 | Reis, Jr. et al. | June 3, 1930 |
| 1,855,581 | Meade | Apr. 26, 1932 |
| 1,996,836 | Sevison | Apr. 9, 1935 |
| 2,757,749 | Cooper et al. | Aug. 7, 1956 |